United States Patent [19]

Tsuruta

[11] Patent Number: 4,650,136
[45] Date of Patent: Mar. 17, 1987

[54] MAGNETIC TAPE CASSETTE

[75] Inventor: Masao Tsuruta, Kanagawa, Japan

[73] Assignee: Fuji Photo Film Co., Ltd., Kanagawa, Japan

[21] Appl. No.: 653,758

[22] Filed: Sep. 24, 1984

[30] Foreign Application Priority Data

Oct. 20, 1983 [JP] Japan .......................... 58-161361[U]

[51] Int. Cl.$^4$ .......................... G03B 1/04; G11B 15/32
[52] U.S. Cl. .................... 242/198; 242/199; 360/132
[58] Field of Search .................. 242/198, 199, 200; 360/60, 128, 132, 139; 24/622, 297, 351

[56] References Cited

U.S. PATENT DOCUMENTS

| 4,134,142 | 1/1979 | Ohashi | 242/198 X |
| 4,148,443 | 4/1979 | Lundquist | 242/198 X |
| 4,163,533 | 8/1979 | Abe | 242/198 |
| 4,288,048 | 9/1981 | Sieben | 242/198 |
| 4,356,601 | 11/1982 | Kimura | 24/297 |
| 4,504,028 | 3/1985 | Goto | 242/198 |
| 4,553,717 | 11/1985 | Takagi | 242/198 |

Primary Examiner—Stuart S. Levy
Assistant Examiner—Lynn M. Sohacki
Attorney, Agent, or Firm—Mion, Zinn, Macpeak & Seas Sughrue

[57] ABSTRACT

A magnetic tape cassette in which the assembly operation of the cassette is made more efficient by prevention of a brake member from springing out of the cassette. A protrusion is formed on at least one of a pair of confronting brake member guides extending from one half of the case of the cassette, while an indentation is formed in the brake member extending parallel to the sliding direction of the brake member and positioned to receive the protrusion when the brake member is fitted between the guides. Engagement of the protrusion with the indentation prevents the brake member from springing out during the assembly of the cassette.

12 Claims, 8 Drawing Figures

MAGNETIC TAPE CASSETTE

BACKGROUND OF THE INVENTION

The present invention relates to magnetic tape cassettes, and more particularly to an improved video tape cassette with a slide type brake member which is used to stop the rotation of the tape reels of the cassette.

In a conventional video tape cassette, the periphery of one of the two flanges of each of a pair of tape reels on which the magnetic tape is wound is formed with gear teeth, and the pawls of a slide type brake member are engaged therewith to prevent the tape reels from rotating when the cassette is not in use.

The configuration of the above-described slide type brake member is shown in FIG. 1. The brake member 1 has a recess 4 in the bottom of its body into which a release bar 14 (described below) of the recording and reproducing device is inserted, and a pair of pawls 5 on the front 2 of the body. The brake member 1 is arranged in the cassette with the recess 4 confronting a release bar inserting hole 10 in the lower half 7 of the cassette. The brake member 1 is urged towards a tape reel 11 by a spring 6 inserted between the brake member 1 and the wall 8 of the cassette, as shown in FIG. 2.

The periphery of one of the flanges 12 of the tape reel 11 is formed into a gear 13. When the cassette is not in use, the pawls 5 of the brake member 1 are engaged with the gear 13 by the elastic force of the spring 6 so as to prevent the tape from being unintentionally unwound. When the cassette is used, the tapered end of the release bar 14 is inserted through the release bar inserting hole 10 into the recess 4. Upon insertion of the release bar, the brake member 1 is slid away from the tape reel 11, being guided to move only in the direction of the arrow A, as a result of which the pawls 5 are disengaged from the gear 13.

However, the brake member 1 is liable to move unexpectedly during the assembly of the cassette; for instance, it may spring out of the lower half 7 due to the elastic force of the spring member 6. Accordingly, it is difficult to control the position of the brake member 1 until the latter is covered by the upper half 9, which lowers the efficiency of the cassette assembly operation.

SUMMARY OF THE INVENTION

Accordingly, an object of the present invention is to provide a cassette in which the above-described difficulty has been eliminated.

The foregoing and other objects of the invention have been achieved by the provision of a cassette comprising upper and lower halves; a pair of tape reels each having gear teeth formed in the periphery of one of the flanges thereof; and a brake member which is disengageable from the gears by a release bar, in which, according to the invention, when or after the lower half is molded, a brake member holding protrusion is formed on at least one of the surfaces of a pair of brake member guides, and a groove or step is formed in the brake member so as to engage with the protrusion, whereby the engagement of the protrusions with the groove or step prevents the brake member from springing out during assembly.

DESCRIPTION OF THE PREFERRED EMBODIMENTS

Preferred embodiments of the invention will now be described with reference to FIGS. 3 and 4.

Figure 1:
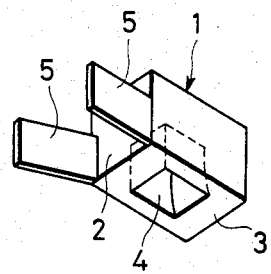
FIG. 1 is a perspective view showing a conventional brake member.
Figure 2:
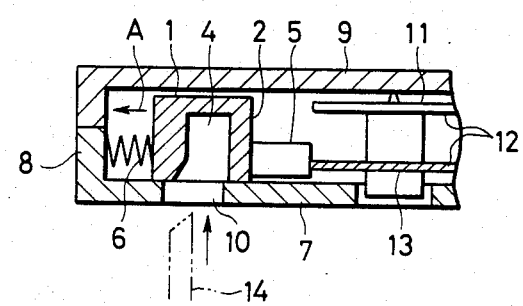
FIG. 2 is a cross-sectional view showing the conventional brake member placed in the cassette.
Figure 3:
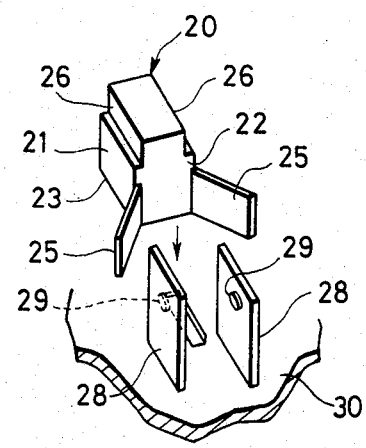
FIG. 3 is an exploded perspective view showing essential components of a cassette of the invention.

FIG. 3 is an exploded perspective view showing essential components of a cassette of the invention. A brake member 20 has a pair of pawls 25 on the front 22 of its body and a recess 24 (FIG. 4) in the bottom 23 of the body, and thus is of substantially the same configuration as the conventional brake member described above. However, it should be noted that opposite sides 21 of the body have steps 26 extending along their upper edges. The lower half 30 has a pair of brake member guides 28 which have confronting surfaces. Protrusions 29 are formed on the surfaces of the guides 28.

Figure 4:
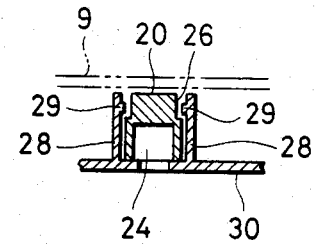
FIG. 4 is a cross-sectional view showing portions of the cassette of the invention.

As is apparent from the cross-sectional view of FIG. 4, the difficulty of the brake member 20 springing out of the lower cassette during assembly is eliminated because the steps 26 of the brake member 20 abut against the protrusions 29 of the guides 28. As is clear from FIG. 3, the guides 28 are merely a pair of side walls extending from the lower half of the cassette case, and therefore the brake member 20 can easily be inserted between the guides 28 from above due to the normal elasticity of the guides 28.

Figure 5:
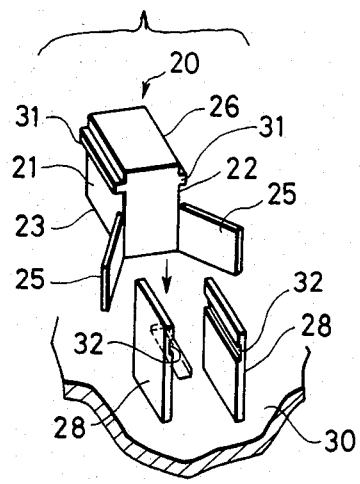
FIG. 5 and 6 are views similar to FIGS. 3 and 4, respectively, showing an alternative embodiment of the invention.
Figure 6:
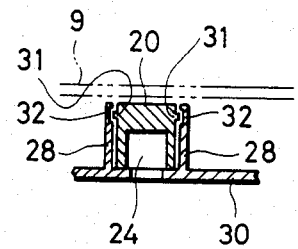

The protrusions 29 may be formed on guides 28 when the lower half 30 is molded. The protrusions may be molded of plastic resin. Also, after the lower half 30 has been molded, the protrusions 29 may be formed by pressing. The configurations of the steps 26 of the brake member 20 and the protrusions 29 of the guides 28 may be other than illustrated in FIGS. 3 and 4. Moreover, the brake member and the guides may be modified so that protrusions 31 are formed on the sides of the brake member and recesses 32 formed in the confronted surfaces of the guides, as shown in FIGS. 5 and 6.

Figure 7:
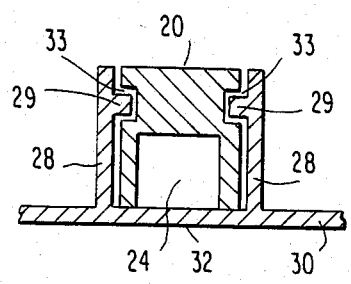
FIGS. 7 and 8 are views similar to FIGS. 4 and 6, respectively, showing further alternative embodiments of the invention.
Figure 8:
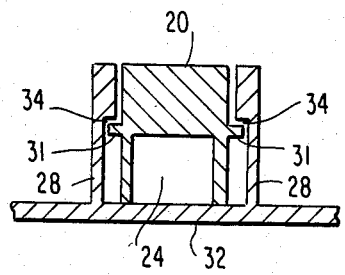

Also, for example, as shown in FIG. 7, the brake member 2 may contain grooves 33 into which the indentations 29 fit. Alternatively, as shown in FIG. 8, the guides 28 may contain steps 34 which cover the protrusions 31.

As is apparent from the above description, according to the invention, the very simple protrusions 29 formed on the guides 28 prevent the brake member 20 from springing out during assembly. Thus, the efficiency of the cassette assembly operation is improved.

As the protrusions 29 are slightly protruded from the confronted surfaces of the guides 28, the brake member 20 can be readily inserted between the guides 28 from above.

I claim:

1. In a magnetic tape cassette comprising upper and lower halves, a pair of tape reels each having gear teeth formed in a periphery of a flange thereof, and a brake member selectively engageable and disengageable with said gear teeth by a release bar, the improvement comprising:

a pair of resilient confronting brake member guides on one half of a case of said cassette, at least one of said guides having a protrusion on a side facing the other of said guides, wherein an indentation is formed in said brake member extending parallel to a sliding direction of said brake member and positioned to receive said protrusion when said brake member is fitted between said guides, and wherein said guides are configured such that said brake member may be pressed downwardly between said guides and thereafter held between said guides by cooperation of said protrusion and said indentation;

whereby engagement of said protrusion with said indentation prevents said brake member from springing out during assembly of said cassette.

2. The magnetic tape cassette of claim 1, wherein said guides are formed by extrusion molding of plastic resin and said protrusion is formed by pressing.

3. The magnetic tape cassette of claim 1, wherein said guides are formed simultaneously with said protrusion by extrusion molding of plastic resin.

4. The magnetic tape cassette of claim 1, wherein one said indentation is formed on each side of said brake member and one said protrusion is formed on each of said guides.

5. The magnetic tape cassette of claim 1, wherein said indentation is a step.

6. The magnetic tape cassette of claim 1, wherein said indentation is a groove.

7. In a magnetic tape cassette comprising upper and lower halves, a pair of tape reels each having gear teeth formed in a periphery of a flange thereof; and a brake member selectively engageable and disengageable with said gear teeth by a release bar, the improvement wherein:

a protrusion is formed on at least one side of said brake member extending parallel to a sliding direction of said brake member; the improvement further comprising a pair of resilient confronting brake member guides on one half of a case of said cassette, a indentation being formed on at least one of said guides on a side facing the other of said guides, said protrusion being received in said indentation when said brake member is fitted between said guides, wherein said guides are configured such that said brake member may be pressed downwardly between said guides and thereafter held between said guides by cooperation of said protrusion and said indentation, and whereby engagement of said protrusion with said indentation prevents said brake member from springing out during assembly of said cassette.

8. The magnetic tape cassette of claim 7, wherein said guides are formed by extrusion molding of plastic resin.

9. The magnetic tape cassette of claim 7, wherein said guides are formed simultaneously with said indentation by extrusion molding of plastic resin.

10. The magnetic tape cassette of claim 7, wherein one said indentation is formed on each of said guides and one said protrusion is formed on each side of said brake member.

11. The magnetic tape cassette of claim 7, wherein said indentation is a step.

12. The magnetic tape cassette of claim 7, wherein said indentation is a groove.

* * * * *